US008401425B2

(12) United States Patent
Kuroda et al.

(10) Patent No.: US 8,401,425 B2
(45) Date of Patent: Mar. 19, 2013

(54) CHARGING MEMBER, PROCESS CARTRIDGE, AND ELECTROPHOTOGRAPHIC APPARATUS

(75) Inventors: Noriaki Kuroda, Suntou-gun (JP); Noriko Nagamine, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/369,105

(22) Filed: Feb. 8, 2012

(65) Prior Publication Data

US 2012/0134709 A1 May 31, 2012

Related U.S. Application Data

(63) Continuation of application No. PCT/JP2011/005252, filed on Sep. 16, 2011.

(30) Foreign Application Priority Data

Sep. 27, 2010 (JP) ................................ 2010-215810

(51) Int. Cl.
*G03G 15/02* (2006.01)
*B32B 9/04* (2006.01)

(52) U.S. Cl. ........ 399/111; 399/168; 399/176; 428/446; 428/447; 428/451

(58) Field of Classification Search .................. 399/111, 399/168, 176; 428/446, 447, 451
See application file for complete search history.

(56) References Cited

U.S. PATENT DOCUMENTS

| | | | |
|---|---|---|---|
| 7,693,457 | B2 | 4/2010 | Kuruma et al. |
| 7,962,068 | B2 | 6/2011 | Kuroda et al. |
| 8,064,803 | B2 | 11/2011 | Kuroda et al. |
| 8,092,358 | B2 | 1/2012 | Kuruma et al. |
| 2010/0226684 | A1 | 9/2010 | Mayuzumi et al. |
| 2011/0182618 | A1 | 7/2011 | Kuruma et al. |
| 2011/0217072 | A1 | 9/2011 | Kuroda et al. |
| 2012/0076535 | A1 | 3/2012 | Nagamine et al. |
| 2012/0076924 | A1 | 3/2012 | Mayuzumi et al. |
| 2012/0082481 | A1 | 4/2012 | Nagamine et al. |
| 2012/0093539 | A1 | 4/2012 | Nagamine et al. |
| 2012/0107565 | A1 | 5/2012 | Kuroda et al. |
| 2012/0121296 | A1 | 5/2012 | Kuroda et al. |
| 2012/0141159 | A1 | 6/2012 | Nagamine et al. |
| 2012/0141160 | A1 | 6/2012 | Tomomizu et al. |

FOREIGN PATENT DOCUMENTS

| | | | |
|---|---|---|---|
| JP | 2001-305832 | A | 11/2001 |
| JP | 2007-264611 | A | 10/2007 |
| JP | 2002-80785 | A | 3/2009 |
| JP | 2009-151159 | A | 7/2009 |
| JP | 2009-151160 | A | 7/2009 |
| JP | 2010-76205 | A | 4/2010 |

*Primary Examiner* — D. S. Nakarani

(74) *Attorney, Agent, or Firm* — Fitzpatrick, Cella, Harper & Scinto

(57) ABSTRACT

Provided is a charging member capable of suppressing adhesion of toner or the like to a surface. The charging member comprises: a support; an elastic layer; and a surface layer, and the surface layer contains a polymer having an Si—O—Sr bond and having a structural unit represented by the following formula (1) and a structural unit represented by the following formula (2).

formula (1)

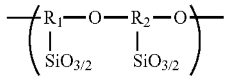

formula (2)

$SrO_{2/2}$

7 Claims, 6 Drawing Sheets

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2011/005252, filed Sep. 16, 2011, which claims the benefit of Japanese Patent Application No. 2010-215810, filed Sep. 27, 2010.

BACKGROUND OF THE INVENTION

1. Field of the Invention

The present invention relates to a charging member and to a process cartridge or the like using the charging member.

2. Description of the Related Art

In an electrophotographic apparatus adopting a contact charging mode, toner, an external additive used in the toner, a discharge product, a paper powder, or the like may adhere to the surface of a charging member, which is brought into contact with an electrophotographic photosensitive member, owing to long-term use of the apparatus.

For example, the electrophotographic apparatus is provided with a cleaning blade for removing the toner remaining on the surface of the electrophotographic photosensitive member even after the step of transferring a toner image. In recent years, however, reduction in the particle diameter of the toner and its spheroidization have progressed, and hence it has started to become easy for the toner to escape the cleaning blade. The toner that has escaped the cleaning blade moves toward the surface of the charging member at a nip between the electrophotographic photosensitive member and the charging member, and in the end, fixes onto the surface of the charging member in some cases. In the charging member having on its surface a portion onto which the toner has fixed, the portion may differ from any other portion in ability to charge the electrophotographic photosensitive member, and the difference serves as an obstacle to uniform charging of the electrophotographic photosensitive member in some cases.

In addition, when image formation is intermittently performed with the electrophotographic apparatus, the rotation of the electrophotographic photosensitive member may stop once. In this case, such state that the toner accumulates on the portion of the electrophotographic photosensitive member abutting on the cleaning blade is established. In addition, when the electrophotographic photosensitive member starts to rotate again thereafter, the toner accumulating on the portion of the electrophotographic photosensitive member abutting on the cleaning blade escapes the cleaning blade to adhere to the surface of the charging roller in a streak fashion in some cases. An electrophotographic image formed by the electrophotographic photosensitive member charged by the charging member to which the toner has adhered in a streak fashion may show streak-like unevenness corresponding to the streak-like toner adhering to the charging member.

With regard to the adhesion of the toner that causes such problem, Japanese Patent Application Laid-Open No. 2002-080785 discloses a conductive, organic-inorganic hybrid film that is formed of a metallic alkoxide and/or a metalloid alkoxide formed by a sol-gel method, and an organosilicon compound, and disperses conductive filler therein. In addition, Japanese Patent Application Laid-Open No. 2002-080785 describes that the organic-inorganic hybrid film is excellent in toner releasability because of its large contact angle with water.

As a result of investigations conducted by the inventors of the present invention on the invention according to Japanese Patent Application Laid-Open No. 2002-080785, however, the inventors have acknowledged that an additional reduction in the surface free energy of the surface of the charging member needs to be achieved for suppressing the streak-like adhesion of the toner to the charging member upon such intermittent electrophotographic image formation as described above.

SUMMARY OF THE INVENTION

In view of the foregoing, the present invention is directed to provide a charging member capable of suppressing streak-like adhesion of toner or the like with additional reliability even when an electrophotographic photosensitive member is activated from its stop state.

Further, the present invention is directed to provide a process cartridge and an electrophotographic apparatus each capable of stably forming high-quality electrophotographic images.

According to one aspect of the present invention, there is provided a charging member, comprising: a support; an elastic layer; and a surface layer, wherein the surface layer contains a polymer having an Si—O—Sr bond and having a structural unit represented by the following formula (1) and a structural unit represented by the following formula (2).

formula (1)

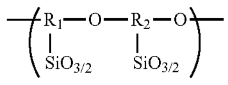

formula (2)

$$SrO_{2/2}$$

In the above-mentioned formula (1), $R_1$ and $R_2$ each independently represent any one of the following formulae (3) to (6).

formula (3)

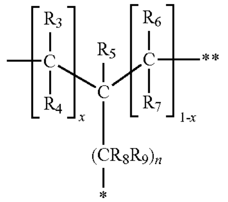

formula (4)

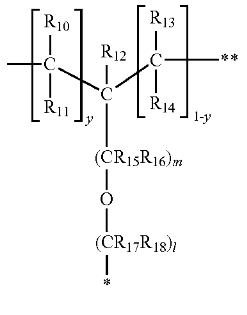

-continued formula (5)

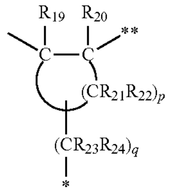

formula (6)

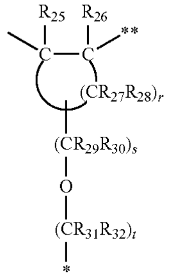

In the formulae (3) to (6), $R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms; $R_{21}$, $R_{22}$, $R_{27}$, and $R_{28}$ each independently represent hydrogen, an alkoxy group having 1 to 4 carbon atoms, or an alkyl group having 1 to 4 carbon atoms; n, m, l, q, s, and t each independently represent an integer of from 1 to 8; p and r each independently represent an integer of from 4 to 12; x and y each independently represent 0 or 1; and a symbol "*" and a symbol "**" represent bonding positions to a silicon atom and an oxygen, atom in the formula (1), respectively.

According to another aspect of the present invention, there is provided a process cartridge, comprising the above-described charging member; and a photosensitive member, wherein the process cartridge is detachably mountable to a main body of an electrophotographic apparatus.

According to further aspect of the present invention, there is provided an electrophotographic apparatus, comprising the above-described charging member.

A charging member capable of adhering hardly toner or the like to the surface of the member and exerting stable charging performance over a long time period can be obtained.

In addition, a process cartridge and an electrophotographic apparatus capable of stably forming high-quality electrophotographic images can be obtained.

Further features of the present invention will become apparent from the following description of exemplary embodiments with reference to the attached drawings.

DESCRIPTION OF THE EMBODIMENTS

A charging member to be used in an electrophotographic apparatus according to the present invention (which may hereinafter be simply referred to as "charging member"), has a support, a conductive elastic layer formed on the support, and a surface layer formed on the conductive elastic layer.

Figure 1:
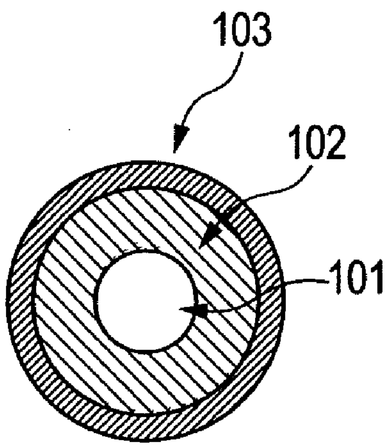
FIG. 1 is a view illustrating an example of the construction of a charging member according to the present invention.

The simplest construction of the charging member is such a construction that the two layers, i.e., the conductive elastic layer and the surface layer are provided on the support. It should be noted that one or two or more other layers can be provided between the support and the conductive elastic layer or between the conductive elastic layer and the surface layer. In FIG. 1 illustrating a section of a charging roller as the charging member according to the present invention, the support is represented by 101, the conductive elastic layer is represented by 102, and the surface layer is represented by 103.

(Support)

A conductive support can be used as the support. A material for the conductive support is, for example, iron, copper, stainless steel, aluminum, an aluminum alloy, or nickel.

(Conductive Elastic Layer)

One kind or two or more kinds of elastic bodies such as rubbers and thermoplastic elastomers used in the elastic layers (conductive elastic layers) of the conventional charging members can each be used as a material for forming the conductive elastic layer.

Examples of the rubbers include a urethane rubber, a silicone rubber, a butadiene rubber, an isoprene rubber, a chloroprene rubber, a styrene-butadiene rubber, an ethylene-propylene rubber, a polynorbornene rubber, a styrene-butadiene-styrene rubber, an acrylonitrile rubber, an epichlorohydrin rubber, and an alkyl ether rubber.

Examples of the thermoplastic elastomers include a styrene-based elastomer and an olefin-based elastomer. As commercially available products of the styrene-based elastomer, there are given "Rabalon" manufactured by Mitsubishi Chemical Corporation and "SEPTON compound" manufactured by Kuraray Co., Ltd. As commercially available products of the olefin-based elastomer, there are given "Thermolan" manufactured by Mitsubishi Chemical Corporation, "Milastomer" manufactured by Mitsui Chemicals, Inc., "Sumitomo TPE" manufactured by Sumitomo Chemical Co., Ltd., and "Santoprene" manufactured by Advanced Elastomer Systems Co., Ltd. In addition, the conductivity of the conductive elastic layer can be adjusted to a predetermined value by appropriately using a conductive agent. The electrical resistance of the conductive elastic layer can be adjusted by appropriately selecting the kind and usage of the conductive agent, and the electrical resistance suitably falls within the range of $10^2$ to $10^8\Omega$, more suitably falls within the range of $10^3$ to $10^6\Omega$.

Examples of the conductive agent to be used in the conductive elastic layer include a cationic surfactant, an anionic surfactant, a zwitterionic surfactant, an antistatic agent, and an electrolyte. Ketjen Black EC, acetylene black, carbon for rubber, carbon for (color) ink subjected to oxidation treatment, conductive carbon such as pyrolytic carbon, or graphite such as natural graphite or artificial graphite can also be used as the conductive agent.

In addition, an inorganic or organic filler, or a crosslinking agent may be added to the conductive elastic layer. The hardness of the conductive elastic layer is preferably 50° or more, in particular, more preferably from 70° to 90° in terms of MD-1 hardness from the viewpoint of the suppression of the deformation of the charging member when the charging member and an electrophotographic photosensitive member as a body to be charged are brought into abutment with each other.

(Surface Layer)

The surface layer is formed on the conductive elastic layer by a dipping method or a coating method. The elastic modulus of the surface layer of the charging member is preferably 2,000 MPa or less from such a viewpoint that a function of the conductive elastic layer provided for sufficiently securing an abutment nip with the electrophotographic photosensitive member is sufficiently exerted. On the other hand, a crosslink density generally tends to reduce as the elastic modulus of the surface layer reduces. As a result, a low-molecular weight component that has bled out toward the surface of the charging member may contaminate the surface of the electrophotographic photosensitive member. Accordingly, the elastic modulus of the surface layer of the charging member is preferably 100 MPa or more.

A suppressing effect on the bleedout of the low-molecular weight component described above enlarges as the thickness of the surface layer increases. On the other hand, the chargeability of the charging member is improved as the thickness of the surface layer reduces. Accordingly, as a guideline, the thickness of the surface layer is preferably from 0.01 to 0.10 μm, particularly preferably from 0.02 to 0.08 μm.

In addition, as a guideline, the volume resistivity of the surface layer is preferably from $1\times10^{10}$ to $1\times10^{16}$ Ω·cm. Further, the surface roughness (Rzjis) of the surface of the charging member, i.e., the surface layer is preferably 15 μm or less, particularly preferably 10 μm or less, more preferably 5 μm or less from the viewpoint of additional suppression of the fixation of toner or an external additive to the surface of the charging member.

The surface layer contains a polymer having an Si—O—Sr bond and having a structural unit represented by the following formula (1) and a structural unit represented by the following formula (2).

formula (1)

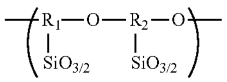

formula (2)

$SrO_{2/2}$

In the above-mentioned formula (1), $R_1$ and $R_2$ each independently represent any one of the following formulae (3) to (6).

formula (3)

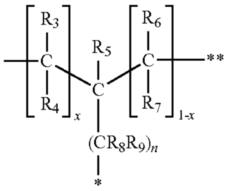

formula (4)

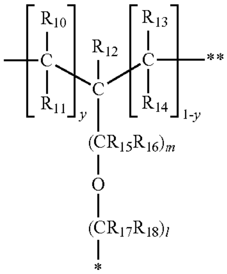

formula (5)

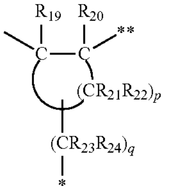

formula (6)

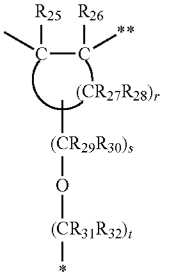

In the above-mentioned formulae (3) to (6), $R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms; $R_{21}$, $R_{22}$, $R_{27}$, and $R_{28}$ each independently represent hydrogen, an alkoxy group having 1 to 4 carbon atoms, or an alkyl group having 1 to 4 carbon atoms; n, m, l, q, s, and t each independently represent an integer of from 1 to 8; p and r each independently represent an integer of from 4 to 12; x and y each independently represent 0 or 1; and a symbol "*" and a symbol "**" represent bonding positions to a silicon atom and an oxygen atom in the formula (1), respectively.

When a total amount of molar contents of silicon atoms and strontium atoms in the surface layer is set to 100 mol %, the content of the strontium atoms is preferably from 5 mol % to 20 mol %. Thus, an additional reducing effect on the surface free energy can be achieved.

It is preferred that $R_1$ and $R_2$ in the formula (1) each independently represent a structure selected from the group consisting of structures represented by the following formulae (8) to (11).

formula (8)

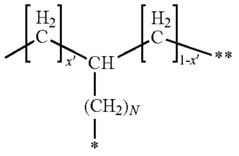

formula (9)

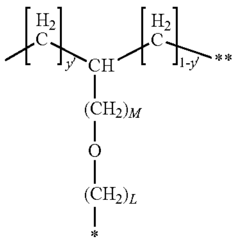

formula (10)

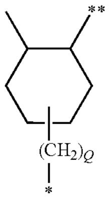

formula (11)

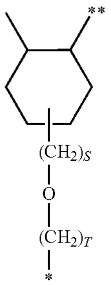

In the formulae (8) to (11), N, M, L, Q, S, and T each independently represent an integer of from 1 to 8; x' and y' each independently represent 0 or 1; and a symbol "*" and a symbol "**" represent bonding positions to a silicon atom and an oxygen atom in the formula (1), respectively.

It is preferred that the polymer in the surface layer has an Si—O—Zr bond in addition to an Si—O—Sr bond, and has a structural unit represented by the formula (1), a structural unit represented by the formula (2), and a structural unit represented by the following formula (7). The surface layer containing the polymer containing those structural units is preferred for reducing a coefficient of kinetic friction.

$$ZrO_{4/2} \qquad \text{Formula (7)}$$

Figure 10A:
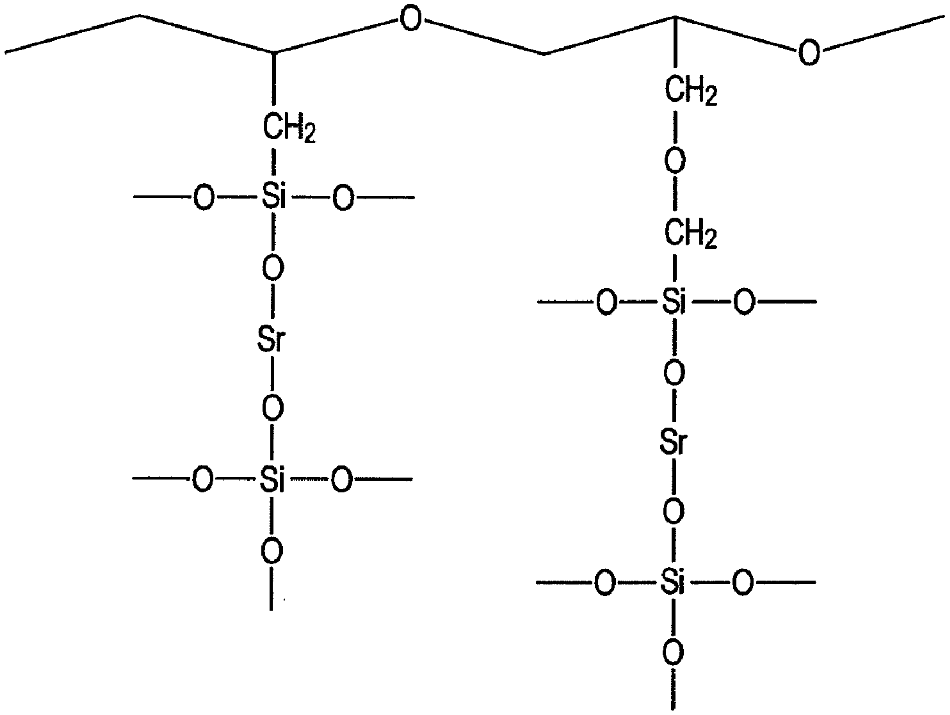
FIG. 10A is a view illustrating the chemical structure of a polymer according to the present invention.

FIG. 10A illustrates, as an example of the polymer according to the present invention, a structure when $R_1$ in the formula (1) is represented by the formula (3) and $R_2$ therein is represented by the formula (4).

Figure 10B:
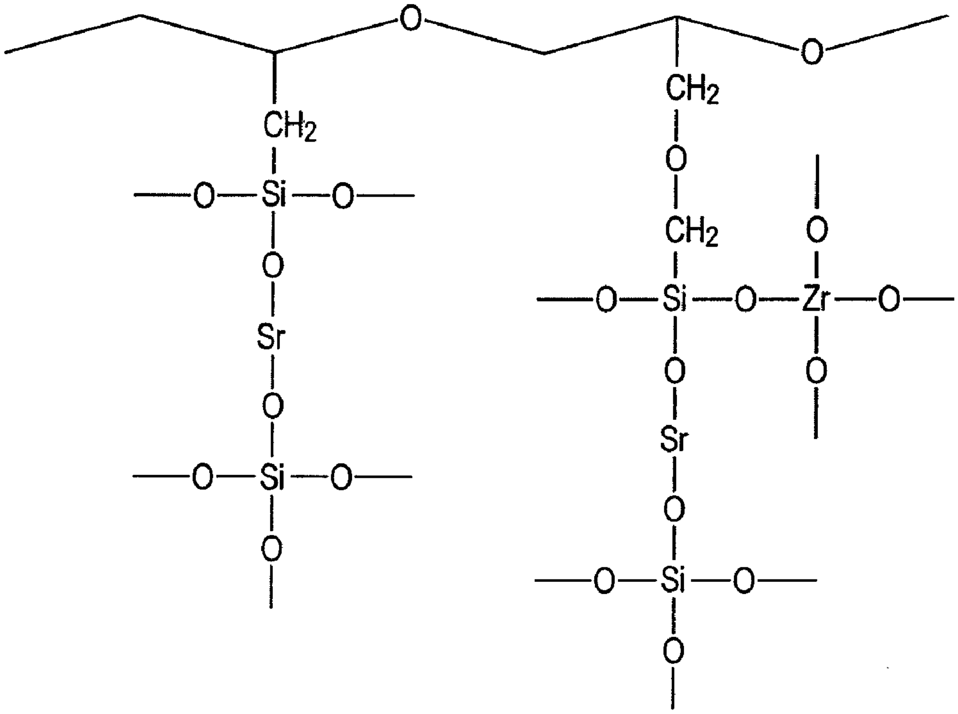
FIG. 10B is a view illustrating the chemical structure of a polymer according to the present invention.

In addition, FIG. 10B illustrates, as another example, part of the structure of the following polymer. $R_1$ in the formula (1) is represented by the formula (3) and $R_2$ therein is represented by the formula (4), and the polymer contains a structure represented by the above-mentioned formula (7) in addition to a structure represented by the formula (2), and has an Si—O—Sr bond and an Si—O—Zr bond in a molecule thereof.

When a total amount of molar contents of silicon atoms, strontium atoms, and zirconium atoms in the surface layer is set to 100 mol %, it is preferred that the content of the strontium atoms be from 5 mol % to 20 mol %, and the content of the zirconium atoms be from 40 mol % to 67 mol %.

When the molar contents of the strontium atoms and the zirconium atoms fall within the ranges, the adhesion or fixation of toner, an external additive, and the like to the surface of the charging member can be suppressed because the surface free energy is low and the coefficient of kinetic friction is also low. It is preferred that the coefficient of kinetic friction (μd) of the charging member is from 0.15 to 0.35, and the surface free energy ($\gamma^{Total}$) of the charging member be from 25 (mJ/m$^2$) to 35 (mJ/m$^2$). When the coefficient of kinetic friction and the surface free energy fall within those ranges, the adhesion or fixation of the toner, the external additive, and the like to the surface of the charging member can be suppressed.

The charging member for electrophotography of the present invention can be produced by, for example, a method including the following steps (1) to (3).

In the step (1), a mixed solution containing a first hydrolyzable silane compound represented by the following formula (12), a second hydrolyzable silane compound represented by the following formula (13), a hydrolyzable strontium compound represented by the following formula (14), a hydrolyzable zirconia compound represented by the following formula (15), water, and an alcohol is refluxed under heat so that the hydrolysis and condensation of the hydrolyzable compounds in the mixed solution may be performed.

$$R^3—Z—Si—(OR^2)_3 \qquad \text{formula (12)}$$

$$R^4—Si—(OR^2)_3 \qquad \text{formula (13)}$$

$$Sr—(OR^2)_2 \qquad \text{formula (14)}$$

$$Zr—(OR^2)_4 \qquad \text{formula (15)}$$

In the above-mentioned formulae (12) to (15), Z represents a divalent organic group; $R^2$ represents a saturated or unsaturated hydrocarbon group; $R^3$ represents a cationically polymerizable organic group; and $R^4$ represents a substituted or unsubstituted alkyl or aryl group.

In the step (2), a photopolymerization initiator is added to the solution containing the hydrolyzed condensate obtained in the step (1) so that a coating solution for forming a surface layer may be prepared.

In the step (3), a coating film of the coating solution is formed on the peripheral surface of the conductive elastic layer formed on the peripheral surface of the support, and the coating film is cured so that the surface layer may be formed.

(Method of Producing Charging Member)

Hereinafter, the steps of producing the charging member are sequentially described.

Step (1):

The first hydrolyzable silane compound is preferably a hydrolyzable silane compound having a cationically polymerizable group. The term "cationically polymerizable group" means a cationically polymerizable organic group that produces an oxyalkylene group as a result of cleavage, and examples of the group include groups in each of which $R^3$ in the formula (12) represents a cyclic ether group such as an epoxy group or an oxetane group, or a vinyl ether group. Of those, an epoxy group is preferred from the viewpoints of ease of availability and the ease with which a reaction is controlled. $R^2$ represents a saturated or unsaturated, monovalent hydrocarbon group. Examples of the divalent organic group represented by Z in the formula (12) include an alkylene group and an arylene group. Of those, an alkylene group having 1 to 6 carbon atoms is preferred and an ethylene group is more preferred.

Examples of the saturated or unsaturated, monovalent hydrocarbon group represented by $R^2$ in the formula (12) include an alkyl group, an alkenyl group, and an aryl group. Of those, a linear or branched alkyl group having 1 to 4 carbon atoms is preferred, and a methyl group, an ethyl group, an n-propyl group, an i-propyl group, an n-butyl group, or a t-butyl group is more preferred.

Specific examples of the hydrolyzable silane compound having a structure represented by the formula (12) are described below.

Glycidoxypropyltrimethoxysilane, glycidoxypropyltriethoxysilane, epoxycyclohexylethyltrimethoxysilane, and epoxycyclohexylethyltriethoxysilane.

The second hydrolyzable silane compound preferably an alkyl-substituted, aryl-substituted, or unsubstituted hydrolyzable silane compound. In the formula (13), $R^4$ represents a phenyl group-substituted alkyl group or an unsubstituted alkyl group, or an alkyl group-substituted aryl group or an unsubstituted aryl group. An alkyl group in the phenyl group-substituted alkyl group or the unsubstituted alkyl group is preferably a linear alkyl group having 1 to 21 carbon atoms, more preferably a linear alkyl group having 6 to 10 carbon atoms. In addition, an aryl group in the alkyl group-substituted aryl group or the unsubstituted aryl group is preferably a phenyl group.

Examples of the saturated or unsaturated, monovalent hydrocarbon group represented by $R^2$ in the formula (13) include an alkyl group, an alkenyl group, and an aryl group. Of those, a linear or branched alkyl group having 1 to 4 carbon atoms is preferred, and a methyl group, an ethyl group, an n-propyl group, an i-propyl group, an n-butyl group, or a t-butyl group is more preferred.

Specific examples of the hydrolyzable silane compound having a structure represented by the formula (13) are described below.

Methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, hexyltrimethoxysilane, hexyltriethoxysilane, hexyltripropoxysilane, decyltrimethoxysilane, decyltriethoxysilane, decyltripropoxysilane, phenyltrimethoxysilane, phenyltriethoxysilane, and phenyltripropoxysilane.

When the hydrolyzable silane compounds each having a structure represented by the formula (13) are used in combination, a hydrolyzable silane compound in which $R^4$ has a linear alkyl group having 6 to 10 carbon atoms and a hydrolyzable silane compound in which $R^4$ has a phenyl group are more preferably combined because compatibility with a solvent is good even when a monomer structure changes owing to hydrolysis, condensation, and a reaction. The hydrolyzable strontium compound is represented by the formula (14), and examples of the saturated or unsaturated, monovalent hydrocarbon group represented by $R^2$ in the formula include an alkyl group, an alkenyl group, and an aryl group. Of those, a linear or branched alkyl group having 1 to 4 carbon atoms is preferred, and a methyl group, an ethyl group, an n-propyl group, an i-propyl group, an n-butyl group, or a t-butyl group is more preferred.

Specific examples of the hydrolyzable strontium compound having a structure represented by the formula (14) are described below.

Strontium diisopropoxide and strontium dimethoxypropoxide.

When the total of the compounds represented by the formulae (12), (13), and (14) is set to 100 mol %, a molar ratio of the compound represented by the formula (14) is preferably from 5 mol % to 20 mol %, particularly preferably from 10 mol % to 15 mol %. Although the reason why the addition of the compound represented by the formula (14) reduces the surface free energy has not been elucidated at present, setting its addition amount to 5 mol % or more results in a large reducing effect on the surface free energy, in other words, a large suppressing effect on the adhesion of a developer or the like to the surface layer. In addition, when the addition amount is 20 mol % or less, a reduction in the denseness of a film and excessive softening of the film due to the progress of a two-dimensional reaction caused by the compound represented by the formula (14) are suppressed. As a result, an abrupt increase in coefficient of kinetic friction at the portion abutting on the photosensitive member, and physical adhesion or fixation of the developer due to rubbing between the charging member and the photosensitive member in association with the increase are suppressed.

Examples of the saturated or unsaturated, monovalent hydrocarbon group represented by $R^2$ in the hydrolyzable zirconia compound represented by the formula (15) include an alkyl group, an alkenyl group, and an aryl group. Of those, a linear or branched alkyl group having 1 to 4 carbon atoms is preferred. More specifically, a methyl group, an ethyl group, an n-propyl group, an i-propyl group, an n-butyl group, and a t-butyl group are given.

Specific examples of the hydrolyzable zirconia compound having a structure represented by the formula (15) are described below.

Zirconium tetraethoxide, zirconium tetraisopropoxide, zirconium tetra-n-propoxide, zirconium tetra-n-butoxide, zirconium tetra-t-butoxide, zirconium tetra-2-ethylhexoside, and zirconium tetra-2-methyl-2-butoxide.

Further, when the total of the compounds represented by the formulae (12), (13), (14), and (15) is set to 100 mol %, the molar ratio of the compound represented by the formula (14) is adjusted to preferably from 5 mol % to 20 mol %, and a molar ratio of the compound represented by the formula (15) is adjusted to preferably from 40 mol % to 67 mol %, more preferably from 50 mol % to 60 mol %.

When the addition amount of the compound represented by the formula (14) described above is increased, the coefficient of kinetic friction also tends to increase. To suppress the increase, the addition of the compound represented by the formula (15) has been found to be capable of suppressing the increase of the coefficient of kinetic friction. This is probably because of the following reason. Four reaction points exist by virtue of the structure of the compound represented by the formula (15), and hence an extremely dense film is formed with ease, in other words, a hard film is formed with ease. Accordingly, deformation at the portion abutting on the photosensitive member does not consume much energy, and as a result, the coefficient of kinetic friction tends to reduce.

Here, setting the molar ratio of the compound represented by the formula (15) to 40 mol % or more results in a large reducing effect on the coefficient of kinetic friction, in other words, a large suppressing effect on the physical adhesion. In addition, setting the molar ratio of the compound represented by the formula (15) to 67 mol % or less can suppress the increase of the surface free energy.

It is estimated that the surface free energy of the film tends to increase as the probability that Zr—OH resulting from the compound represented by the formula (15) remains increases. In addition, even at a synthesis stage, abrupt hydrolysis and condensation reactions can be suppressed as long as the molar ratio of the compound represented by the formula (15) is 67 mol % or less. Accordingly, opacification and precipitation hardly occur.

In addition, a ratio W/Z of a total molar number Z of the compounds represented by the formulae (12), (13), (14), and (15) to be hydrolyzed to the addition amount (molar number W) of water upon preparation of the hydrolyzed condensate is preferably from 0.2 to 3.0. The ratio is more preferably from 0.4 to 2.0. When the W/Z is set to fall within the range, the condensation is sufficiently performed, and hence an unreacted monomer hardly remains. In addition, the progress of the condensation is prevented from excessively quickening, and hence opacification and precipitation hardly occur. In addition, a primary alcohol alone, a mixed system of a primary alcohol and a secondary alcohol, or a mixed system of a primary alcohol and a tertiary alcohol is preferably used as an alcohol upon synthesis of the coating solution. Of those, ethanol alone, a combination of methanol and 2-butanol, or a combination of ethanol and 2-butanol is particularly preferred.

(Example of Measurement of Structural Unit)

Figure 4:
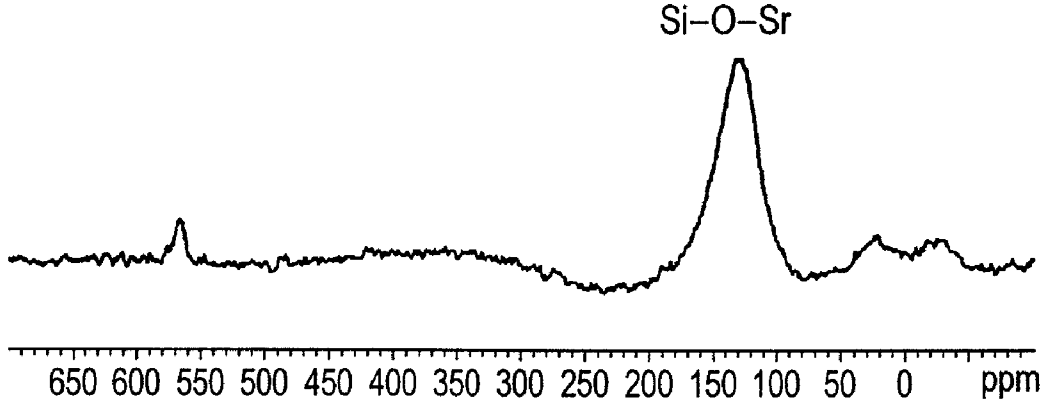
FIG. 4 is a view illustrating an example of a spectrum obtained by the $^{17}O$-NMR measurement of a synthesized product of the present invention.
Figure 5:
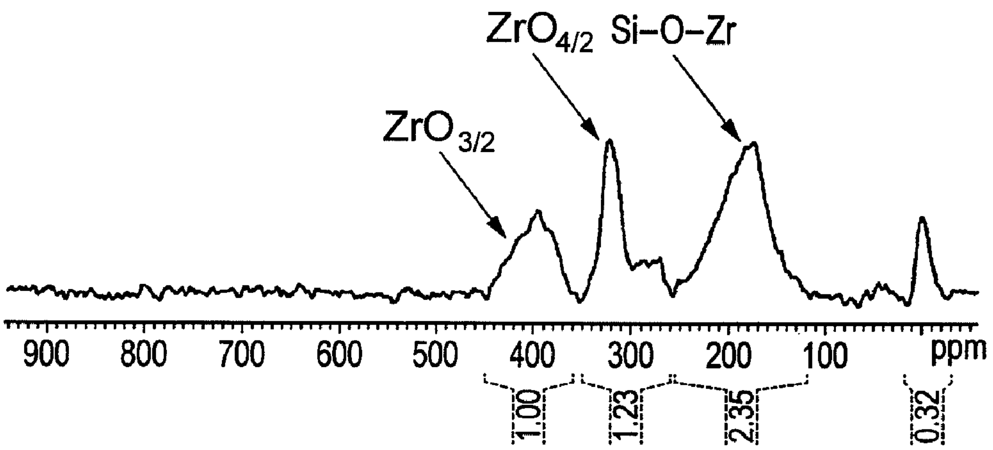
FIG. 5 is a view illustrating an example of a spectrum obtained by the $^{17}O$-NMR measurement of a synthesized product of the present invention.

Next, an example of the measurement of a structural unit (bonded state) of the compound of the surface layer is described. Water is used for hydrolyzing an alkoxyl moiety upon synthesis of the compound. $H_2{}^{17}O$ was used as 10% of the water to be used, and the bonded state was grasped by $^{17}O$-NMR measurement. The measurement was performed with an Avance 500 NMR apparatus as a measuring apparatus and a BBO 5-mmϕ probe at room temperature. FIG. 4 illustrates an example of the result of the measurement of an Si—O—Sr bond. A peak detected at 70 ppm to 200 ppm is a peak derived from —Si—O—Sr—. In addition, FIG. 5 illustrates an example of the result of the measurement of an Si—O—Zr bond. A broad peak at 120 ppm to 250 ppm is assigned to —Si—O—Zr—, a broad peak at 250 ppm to 350 ppm is assigned to a $ZrO_{4/2}$ structure, and a broad peak at 350 ppm to 450 ppm is assigned to a $ZrO_{3/2}$ structure. In addition, an integration ratio among the respective peaks is 2.35:1.23:1.00 as illustrated in FIG. 5. In addition, the bonded state of an Si atom can be measured with a JMN-EX400 NMR apparatus (manufactured by JEOL Ltd.) and an FG Autotune Probe (model: NM-40TH5AT/FG2) at room temperature. Measurement conditions are as shown in Table 1 below.

TABLE 1

| | | |
|---|---|---|
| Measurement | | NNE |
| Pulse width PW1 | | 5.8 μm |
| Pulse repetition time | ACQTM | 1.6384 |
| | PD | 8.3616 |
| Measurement temperature | | Room temperature |
| Number of scans | | 5,000 |
| Deuterated solvent | | $CDCl_3$ |
| Relaxation reagent | | $Cr(acac)_3$ |

Figure 6:
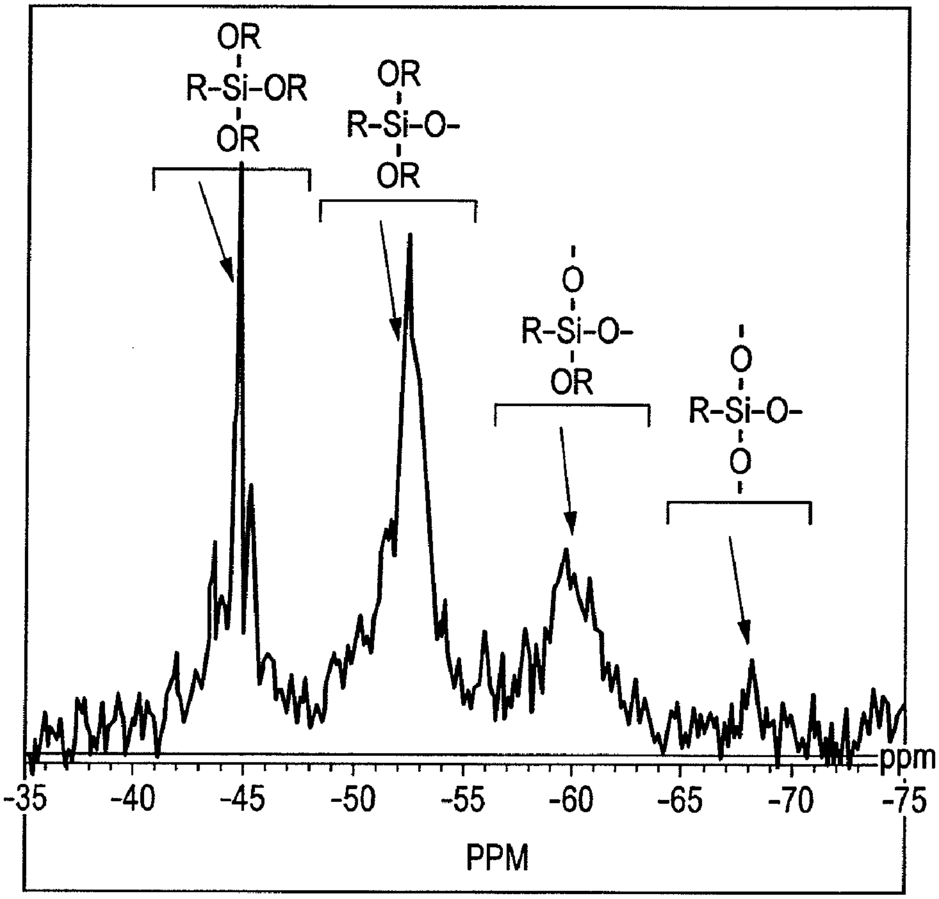
FIG. 6 is a view illustrating an example of a spectrum obtained by the $^{29}Si$-NMR measurement of a synthesized product of the present invention.

FIG. 6 illustrates an example of the result of the measurement. A broad peak at 66 ppm to 72 ppm can be assigned to a structure represented by the formula (1).

Step (2):

In the step (2), the photopolymerization initiator is added to the solution containing the hydrolyzed condensate obtained in the step (1) so that the coating solution for forming a surface layer may be prepared.

Although the photopolymerization initiator is not particularly limited, a cationic polymerization initiator is preferably used from the viewpoint of an improvement in crosslinking efficiency at the time of a crosslinking reaction based on photoirradiation. For example, an epoxy group shows high reactivity for an onium salt of a Lewis acid to be activated with an active energy ray. Accordingly, when the above-mentioned cationically polymerizable group is an epoxy group, the onium salt of the Lewis acid is preferably used as the cationic polymerization initiator.

Other cationic polymerization initiators are, for example, a borate salt, a compound having an imide structure, a compound having a triazine structure, an azo compound, and a peroxide. Of such various cationic polymerization initiators, an aromatic sulfonium salt and an aromatic iodonium salt are preferred from the viewpoints of sensitivity, stability, and reactivity. In particular, a bis(4-tert-butylphenyl)iodonium salt, a compound having a structure represented by the following formula (19) (trade name: Adekaoptomer SP150, manufactured by ADEKA CORPORATION), and a compound having a structure represented by the following formula (20) (trade name: IRGACURE 261, manufactured by Ciba Specialty Chemicals Inc.) are preferred.

(19)

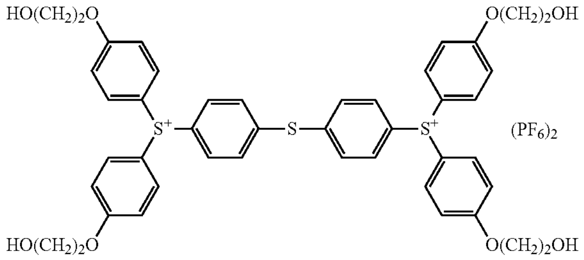

(20)

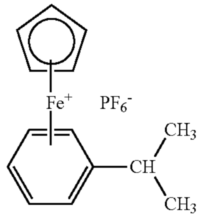

In addition, the photopolymerization initiator is preferably added in an amount of from 1.0 to 5.0 parts by mass with respect to 100 parts by mass of the solid content of the condensate of the compounds represented by the formulae (12), (13), (14), and (15). Setting the addition amount of the photopolymerization initiator within the above-mentioned range enables sufficient curing of the coating film of the coating solution and stems a reduction in the solubility of the photopolymerization initiator in the coating solution. Upon preparation of the coating solution, a proper solvent whose volatility is taken into consideration as well as the solvent used in the synthesis may be used for adjusting a viscosity or improving application property. Examples of the proper solvent include ethyl acetate, methyl ethyl ketone, and a mixture thereof.

Step (3):

In the step (3), first, the coating film of the coating solution is formed on the peripheral surface of the conductive elastic layer formed on the support. Upon application of the coating solution onto the conductive elastic layer, application with a roll coater, immersion application, ring application, or the like can be adopted. Next, the coating film is cured by photoirradiation so that the surface layer may be formed. When the coating film is irradiated with an active energy ray, the cationically polymerizable group which the condensate in the coating solution includes has cleaves, and hence a crosslinking reaction occurs to cure the coating film.

Figure 9:
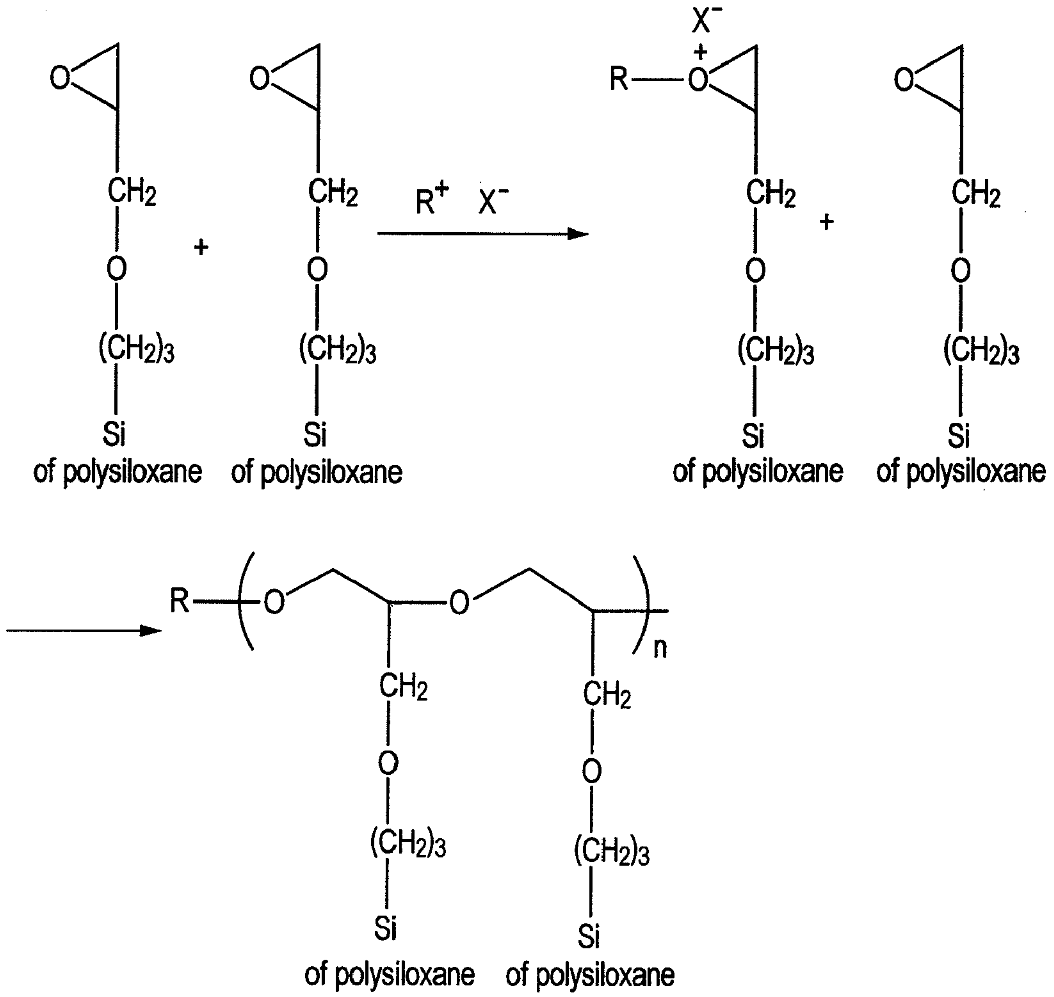
FIG. 9 is an explanatory diagram of a crosslinking reaction in the step of forming a surface layer according to the present invention.

For example, a condensate obtained by hydrolyzing 3-glycidoxypropyltrimethoxysilane as the first hydrolyzable silane compound represented by the formula (12) and the hydrolyzable strontium compound represented by the formula (14) has an epoxy group as the cationically polymerizable group. The epoxy ring of an epoxy group of such condensate opens in the presence of a cationic polymerization catalyst (represented as "$R^+X^-$" in FIG. 9) so that polymerization may progress in a chain fashion. As a result, polysiloxane molecules each containing $SrO_{2/2}$ crosslink with each other to cure. Thus, the polymer according to the present invention is formed. It should be noted that n in FIG. 9 represents an integer of 1 or more.

Ultraviolet light is preferred as the active energy ray to be used for cleaving the cationically polymerizable group. The conductive elastic layer expands by virtue of heat generated at the time of the application of the active energy ray, and then contracts as a result of cooling in some cases. Accordingly, the surface layer may have a large number of crimps or cracks unless the surface layer sufficiently follows the expansion and contraction. In the case of a crosslinking reaction involving using ultraviolet light, however, the hydrolyzed condensate can be crosslinked within a short time period (within 15 minutes). In addition, the quantity of heat to be generated is small. Accordingly, a crimp or a crack hardly occurs in the surface layer.

In addition, when the charging member is placed in an environment whose temperature and humidity abruptly change, a crimp or a crack may occur in the surface layer unless the expansion and contraction of the surface layer sufficiently follow the expansion and contraction of the conductive elastic layer caused by the changes in temperature and humidity. However, when a crosslinking reaction is performed with ultraviolet light that results in the generation of a small quantity of heat, adhesiveness between the conductive elastic layer and the surface layer is improved, and the surface layer becomes able to sufficiently follow the expansion and contraction of the conductive elastic layer. Accordingly, a crimp or crack of the surface layer due to the changes in the temperature and humidity of the environment can be suppressed. In addition, when the crosslinking reaction is performed with ultraviolet light, the deterioration of the conductive elastic layer due to thermal hysteresis can be suppressed. Accordingly, reductions in the electrical characteristics of the conductive elastic layer can also be suppressed.

For the application of UV light, a high-pressure mercury lamp, a metal halide lamp, a low-pressure mercury lamp, an excimer UV lamp, or the like can be used. Of those, an UV light source rich in UV light having a wavelength of from 150 to 480 nm is preferably used. It should be noted that the integral light quantity of UV light is defined as described below.

$$\text{UV integral light quantity (mJ/cm}^2\text{)} = \text{UV light intensity (mW/cm}^2\text{)} \times \text{irradiation time (s)}$$

The integral light quantity of UV light can be adjusted depending on the irradiation time, a lamp output, and a distance between the lamp and a body to be irradiated. In addition, the integral light quantity may be provided with a gradient within the irradiation time. When a low-pressure mercury lamp is used, the integral light quantity of UV light can be measured with a UV integral actinometer "UIT-150-A" or "UVD-S254" manufactured by USHIO INC, for example. When an excimer UV lamp is used, the integral light quantity of UV light can be measured with a UV integral actinometer "UIT-150-A" or "VUV-S172" manufactured by USHIO INC., for example.

<Electrophotographic Apparatus and Process Cartridge>

Figure 2:
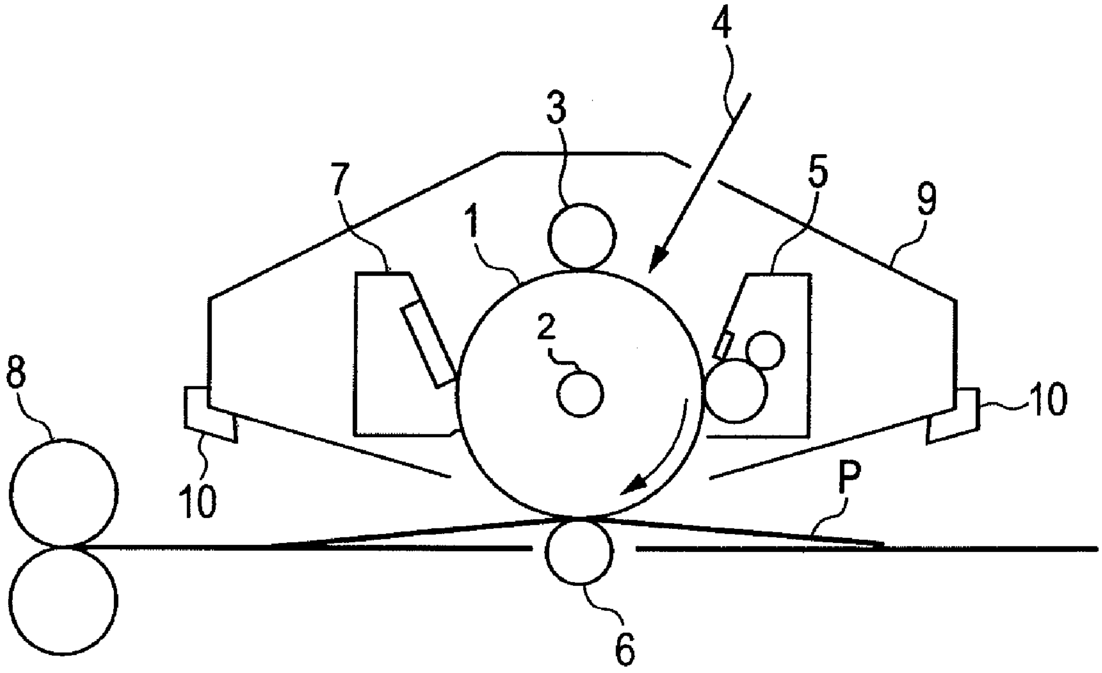
FIG. 2 is a construction view of an electrophotographic apparatus provided with a process cartridge according to the present invention.

FIG. 2 is an example of the schematic construction of an electrophotographic apparatus provided with a process cartridge having the charging member of the present invention. The electrophotographic apparatus has a cylindrical photosensitive member 1 to be rotationally driven around an axis 2 in the direction indicated by an arrow at a predetermined circumferential speed. The photosensitive member may have a support, a photosensitive layer formed on the support, a charge-injecting layer, a surface layer, and the like. The surface of the photosensitive member is uniformly charged to a positive or negative predetermined potential by a charging member 3. Next, the surface receives exposure light (image exposure light) 4 output from exposing unit (not shown) such as slit exposure or laser beam scanning exposure so that electrostatic latent images corresponding to a target image may be formed. Upon charging of the surface of the photosensitive member 1 by the charging member 3, a DC voltage or a voltage obtained by superimposing an AC voltage on a DC voltage is applied to the charging member 3 from voltage-applying unit (not shown).

The electrostatic latent images formed on the surface of the photosensitive member 1 are each supplied with a developer from a developing roller provided for developing unit 5, and are then subjected to reversal development or normal development so as to turn into toner images. Next, the toner images on the surface of the photosensitive member 1 are sequentially transferred by a transfer bias applied to a transfer roller 6 onto a transfer material P such as paper conveyed to a gap between the photosensitive member 1 and the transfer roller 6 in synchronization with the rotation of the photosensitive member. The transfer material P onto which the toner images have been transferred is separated from the surface of the photosensitive member 1 to be introduced into fixing unit 8, and is then printed out as an image-formed product (print or copy) onto which the toner images have been fixed to the outside of the apparatus. In the case of a double image formation mode or a multiple image formation mode, the image-formed product is introduced into a recirculation conveying mechanism, and is then reintroduced into a transfer portion.

A transfer residual developer (toner) on the surface of the photosensitive member 1 after the transfer of the toner images is removed by cleaning unit 7 such as a cleaning blade so that the surface may be cleaned. Further, the surface is subjected to an antistatic treatment by pre-exposure light from pre-exposing unit, and is then repeatedly used for image formation. The photosensitive member 1, the charging member 3, the developing unit 5, and the cleaning unit 7 are integrated to form a process cartridge 9. The process cartridge 9 is detachably mountable to the main body of the electrophotographic apparatus with guiding unit 10 such as a rail of the main body of the electrophotographic apparatus. A cartridge formed of unit appropriately selected from transferring unit and the like in addition to the above-mentioned members can also be detachably mountable to the main body of the electrophotographic apparatus.

Figure 3:
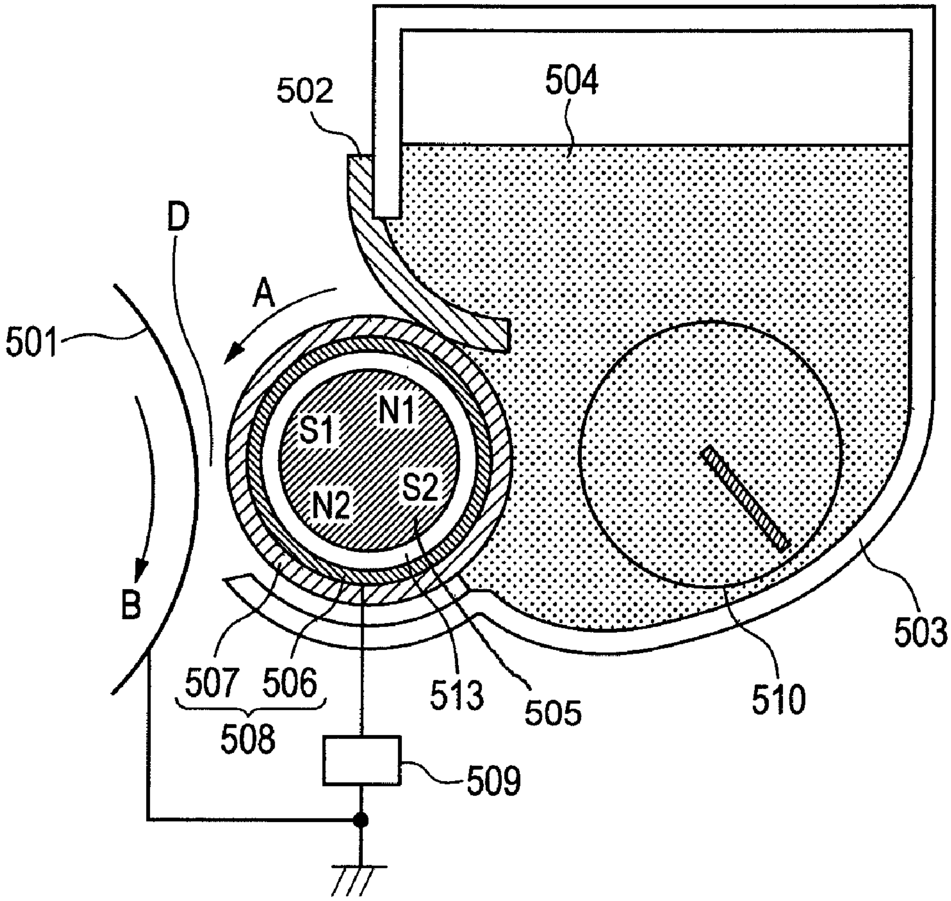
FIG. 3 is a schematic view illustrating an example of a developing apparatus to be used in a developing method of the present invention.

FIG. 3 is a schematic sectional view of the developing apparatus of the above-mentioned developing unit 5. In FIG. 3, an electrophotographic photosensitive drum 501 as an electrostatic latent image-bearing member for bearing an electrostatic latent image formed by a known process is rotated in the direction indicated by an arrow B. A developing sleeve 508 as a developer carrier rotates in the direction indicated by an arrow A while carrying a one-component developer 504 having a magnetic toner supplied from a hopper 503 as a developer container. Thus, the developer 504 is conveyed to a developing region D where the developing sleeve 508 and the photosensitive drum 501 are opposed to each other. As illustrated in FIG. 3, a magnet roller 505 having provided therein magnets (such as an N1 and an S1) is placed in the developing sleeve 508 in order that the developer 504 may be magnetically aspirated and held on the developing sleeve 508. The developing sleeve 508 to be used in the developing apparatus of the present invention has a metal cylindrical tube 506 as a support and a conductive resin coating layer 507 that coats the top of the tube. A stirring blade 510 for stirring the developer 504 is provided in the hopper 503. Reference numeral 513 represents a gap showing that the developing sleeve 508 and the magnet roller 505 are in a non-contact state. The developer 504 obtains triboelectric charge with which an electrostatic latent image on the photosensitive drum 501 can be developed as a result of mutual friction between magnetic toner particles for forming the developer and friction with the conductive resin coating layer 507 on the developing sleeve 508. In the example of FIG. 3, a magnetic regulating blade 502 made of a ferromagnetic metal as a developer thickness-regulating member is provided for regulating the thickness of the developer 504 to be conveyed to the developing region D. The magnetic regulating blade 502 is hung down from the hopper 503 so as to border the developing sleeve 508 with a gap width of about 50 to 500 μm from the surface of the developing sleeve 508. The convergence of lines of magnetic force from the magnetic pole N1 of the magnet roller 505 on the magnetic regulating blade 502 results in the formation of a thin layer of the developer 504 on the developing sleeve 508.

A product obtained by blending a binder resin for a developer with, for example, a colorant, a charge control agent, a releasing agent, inorganic fine particles, and the like is used as the developer (toner). A magnetic one-component developer containing a magnetic material as an essential component and a nonmagnetic one-component developer free of any magnetic material are each available as the type of the developer, and are appropriately selected depending on the developing apparatus. In addition, the developer (toner) to be used in the present invention preferably has a mass-average particle diameter in the range of from 4 μm to 11 μm irrespective of its type. The use of such developer establishes a balance between, for example, the charge quantity of the toner or image quality and an image density.

EXAMPLES

Hereinafter, the present invention is described in more detail by way of specific examples. It should be noted that the term "part(s)" in the examples refers to "part(s) by mass."

Example 1

(1) Formation and Evaluations of Conductive Elastic Layer

100 Parts of a medium high acrylonitrile (trade name: JSR, N230SV (bonded acrylonitrile content: 35.0%), Mooney viscosity ($ML_{1+4}$ 100° C.): 32, specific gravity: 0.98, manufactured by JSR Corporation), 48 parts of carbon black (trade name: Printex 45, particle diameter: 26 nm, nitrogen adsorption specific surface area: 90 $m^2$/g, DBP absorption: 52 $cm^3$/100 g, manufactured by Degussa) as a filler, 20 parts of calcium carbonate (trade name: NANOX #30, manufactured by MARUO CALCIUM CO., LTD.) as a filler, 5 parts of zinc oxide, and 1 part of zinc stearate were kneaded in a 6-L kneader for 20 minutes. 4.5 Parts of tetrabenzylthiuram disulfide (trade name: Sanceler TBZTD, manufactured by SANSHIN CHEMICAL INDUSTRY CO., LTD.) as a vulcanization accelerator and 1.2 parts of sulfur as a vulcanizing agent were added to the kneaded product, and then the mixture was kneaded with an open roll for an additional eight minutes. Thus, a kneaded product I for a conductive elastic layer was obtained.

Next, a thermosetting adhesive containing a metal and a rubber (trade name: METALOC N-33, manufactured by TOYO KAGAKU KENKYUSHO CO., LTD.) was applied to a region extending by up to 115.5 mm on both sides each with respect to the center in the axial direction of the columnar surface of a columnar support made of steel having a diameter of 6 mm and a length of 252 mm (having a nickel-plated surface) (region having a total width in the axial direction of 231 mm). The resultant was dried at a temperature of 80° C. for 30 minutes, and was then further dried at a temperature of 120° C. for 1 hour. Next, the kneaded product I was extruded into a cylindrical shape having an outer diameter of from 8.75 to 8.90 mm with a crosshead extruder onto the support, and then its ends were cut so that the cylindrical extruded product had a length of 242 mm.

Subsequently, the cylindrical extruded product was vulcanized so that a roller having a conductive elastic layer on the support (primary vulcanized product) was obtained. It should be noted that the roller was passed through a continuous heating furnace as described below in order that an abrupt rise in vulcanizing temperature was avoided. The roller was passed through a first zone with its temperature set to 80° C. over 30 minutes, and was then passed through a second zone with its temperature set to 160° C. over 30 minutes.

Next, both ends of the conductive elastic layer (rubber portion) of the roller were cut so that the layer had a width in an axial direction of 232 mm. After that, the surface of the conductive elastic layer was ground with a rotary grindstone so that the roller was of a crown shape having a diameter at each end of 8.26 mm and a diameter at the central portion of 8.5 mm. Thus, a conductive elastic roller 1 was obtained. In this case, the surface of the roller had a ten-point average roughness (Rz) of 8.5 μm and a runout of 20 μm. The ten-point average roughness (Rz) was measured in conformity with JIS B 6101. The runout was measured with a high-accuracy laser measuring machine "LSM-430v" manufactured by Mitutoyo Corporation. Specifically, outer diameters were measured with the measuring machine, and then a difference between the maximum outer diameter and the minimum outer diameter was defined as an outer diameter difference runout. The measurement was performed at five points, and then the average of the outer diameter difference runouts at the five points was defined as the runout of the product subjected to the measurement. The MD-1 hardness of the conductive elastic roller 1 was 58°.

(2) Production and Evaluations of Charging Roller

<Preparation of Hydrolyzed Condensate of Hydrolyzable Silane Compound and Hydrolyzable Strontium Compound>

(Synthesis-1)

Materials shown in Table 2 below were loaded into a 300-ml eggplant flask, and were then stirred and mixed with a football-type stirrer (having a total length of 45 mm and a diameter of 20 mm) at room temperature (a temperature of 25° C.) for 1 minute with the number of revolutions of the stirrer set to 500 rpm.

TABLE 2

| | | |
|---|---|---|
| First hydrolyzable silane compound | Glycidoxypropyltrimethoxysilane (GPTMS) (trade name: KBM-403, manufactured by Shin-Etsu Chemical Co., Ltd.) | 12.21 g (0.052 mol) |

TABLE 2-continued

| | | |
|---|---|---|
| Second hydrolyzable silane compound | Hexyltrimethoxysilane (HeTMS) (trade name: KBM-3063, manufactured by Shin-Etsu Chemical Co., Ltd.) | 65.36 g (0.317 mol) |
| | Ethanol (EtOH) (KISHIDA CHEMICAL Co., Ltd., reagent grade) | 96.53 g |

Next, 11.95 g of ion-exchanged water (having a pH of 5.5) were added dropwise after the number of revolutions of the stirrer was changed to 900 rpm. The solid content of the reaction solution after the dropping of the ion-exchanged water is 28.00 mass %.

After the dropping of the ion-exchanged water, the above-mentioned flask was immersed in an oil bath with its temperature set to 120° C., and the stirring was continued with the number of revolutions of the stirrer set to 750 rpm. The temperature of the contents in the above-mentioned flask reached 120° C. after a lapse of 20 minutes. Then, reflux under heat was performed for 20 hours. Thus, a condensate intermediate-I was obtained.

(Synthesis-2)

Materials shown in Table 3 below were loaded into a 50-ml eggplant flask, and were then stirred at room temperature for 3 hours. Thus, a liquid condensate-1 containing a hydrolyzed condensate of the hydrolyzable silane compounds and a hydrolyzable strontium compound was synthesized.

TABLE 3

| | |
|---|---|
| Condensate intermediate-I | 35.34 g |
| Strontium methoxypropoxide (SrMPr) as a hydrolyzable strontium compound (trade name: AKS793, manufactured by Gelest, Inc., concentration in methoxypropanol: 20%) | 5.65 g (0.004 mol) |

<Evaluation (1): Calculation of Solid Content Concentration (Measurement of Amount of Remaining Monomer)>

The amount of a remaining monomer in the resultant condensate-1 was measured by the following procedure. Calculation is conducted on a mass determined from a structural body as a result of a theoretically complete dehydration-condensation reaction of the hydrolyzable silane compounds and the hydrolyzable strontium compound used in the synthesis of the condensate-1. The measurement is performed as described below. (A) The mass of an aluminum cup is measured in advance. (B) About 2.000 to 3.000 g of the condensate-1 completed in the step (Synthesis-2) are weighed with a precision balance, and the aluminum cup containing the condensate is left to stand in an oven at 200° C. for 30 minutes. (C) The mass is measured again with a precision balance after the standing so that a solid content may be calculated.

$$\text{Solid content (mass \%)} = \frac{C-A}{B} \times 100 \quad \text{(Equation 1)}$$

That the solid content determined by the measurement is equal to the theoretically determined mass substantially means that the amount of the remaining monomer is extremely small. In contrast, when an unreacted monomer exists in the oven, a mass reduction is caused by its volatilization. Accordingly, the amount of the remaining monomer can be determined by measuring the solid content. The solid content concentration of the condensate-1 was 25.25 (mass %).

<Evaluation (2): Evaluation of Condensate-1 for its External Appearance>

The external appearance of the liquid condensate-1 was visually observed and evaluated by the following criteria.

A: The synthesized solution is uniform when visually observed.

B: Although the synthesized solution is slightly opaque when visually observed, the solution can be used as a coating solution after having been filtrated with a membrane filter having a pore diameter of 0.5 μm.

C: The solution opacifies and produces a precipitate.

<Preparation of Coating Solution for Forming Surface Layer>

An aromatic sulfonium salt as a photocationic polymerization initiator (trade name: Adekaoptomer SP-150, manufactured by ADEKA CORPORATION) was diluted with methanol so that the resultant solution had a concentration of 10 mass %.

Then, the above-mentioned methanol-diluted solution of the photocationic polymerization initiator was added so that the amount of the photocationic polymerization initiator was 3.0 parts by mass with respect to 100 parts by mass of the solid content of 50 g of the condensate-1. Next, ethanol was further added to adjust the solid content concentration of the condensate-1 to 3.0 mass %. Thus, a coating solution-1 for forming the surface layer of a charging roller according to this example was prepared.

<Formation of Surface Layer>

The coating solution-1 was applied onto the conductive elastic layer of the conductive elastic roller 1 produced in advance by ring application (discharge amount: 0.008 ml/s, speed of a ring portion: 20 mm/s, total discharge amount: 0.064 ml).

Next, the coating film of the coating solution-1 on the conductive elastic layer was irradiated with ultraviolet light having a wavelength of 254 nm so that an integral light quantity was 9,000 mJ/$cm^2$. Thus, the condensate-1 in the coating film was crosslinked, and as a result, a cured film of the coating film was formed. The cured film was left to stand for several seconds so as to be dried. Thus, the surface layer was formed, and as a result, a charging roller 1 was obtained. It should be noted that a low-pressure mercury lamp (manufactured by HARISON TOSHIBA LIGHTING Corporation) was used for the application of the ultraviolet light.

<Evaluation (3): Measurement of Thickness of Surface Layer>

The thickness of the surface layer was measured by employing the following method. That is, the outermost surface of the charging roller 1 was directly analyzed in a thickness direction with Ar+ ion sputter based on ESCA. Then, the depth at which an Si2p peak intensity no longer changed was defined as the thickness.

Apparatus used; Quantum 2000 (manufactured by ULVAC-PHI, Inc),

X ray; monochromatic Alkα, 25 w, 15 kV, 100 μm,

Pass energy; 23.5 eV,

Step width; 0.1 eV,

Sample tilt angle; 45,

Ar+ sputtering; 4 kV, 2×2 $mm^2$, 6 sec/cycle (sputtering rate; 30 nm/min. $SiO_2$)

<Evaluation (4): Surface Free Energy of Charging Roller>

Contact angles with respect to three kinds of probe liquids each having three known surface free energy components shown in Table 4 below were measured with a contact angle meter (trade name: Model CA-X ROLL, manufactured by Kyowa Interface Science Co., Ltd.) for calculating the surface free energy of the charging roller 1. Conditions under which a contact angle θ is measured are as described below.

Measurement: Droplet method (complete round fitting)
Liquid amount: 1 μl
Recognition of droplet impingement: Automatic
Image processing: Algorithm-no reflection
Image mode: Frame
Threshold level: Automatic It should be noted that in the following description, L and S represent items concerned of a liquid and a solid, respectively.

$\gamma^d$: Dispersion force term
$\gamma^p$: Polarity term
$\gamma^h$: Hydrogen bond term

TABLE 4

| | Kitazaki-Hata theory | | | |
|---|---|---|---|---|
| Probe liquid | $\gamma_L^d$ | $\gamma_L^p$ | $\gamma_L^h$ | $\gamma_L^{Total}$ |
| Water | 29.1 | 1.3 | 42.4 | 72.8 |
| Diiodomethane | 46.8 | 4.0 | 0.0 | 50.8 |
| Ethylene glycol | 30.1 | 0.0 | 17.6 | 47.7 |

Unit: mJ/m$^2$ (20° C.)

In Table 4 above, $\gamma_L^d$, $\gamma_L^p$, and $\gamma_L^h$ represent a dispersion force term, a polar term, and a hydrogen bond term, respectively.

The respective surface free energies ($\gamma_L^d$, $\gamma_L^p$, and $\gamma_L^h$) of the three kinds of probe liquids in Table 4 above, and the contact angles θ with respect to the respective probe liquids obtained by the measurement were substituted into the following equation (2) so that three equations for the respective probe liquids were created. Then, $\gamma_s^d$, $\gamma_s^p$, and $\gamma_s^h$ were calculated by solving those ternary simultaneous equations. Then, the sum of the $\gamma_s^d$, the $\gamma_s^p$, and the $\gamma_s^h$ was defined as the surface free energy ($\gamma^{Total}$). It should be noted that the total surface free energy ($\gamma^{Total}$) of the charging member of the present invention is desirably more than 25 mJ/m$^2$ and 35 mJ/m$^2$ or less.

$$\sqrt{\gamma_L^d \times \gamma_S^d} + \sqrt{\gamma_L^p \times \gamma_S^p} + \sqrt{\gamma_L^h \times \gamma_S^h} = \frac{\gamma_L(1+\cos\theta)}{2}$$

(Calculation Equation 1)

<Evaluation (5): Measurement of Coefficient of Kinetic Friction of Charging Roller>

Figure 7:
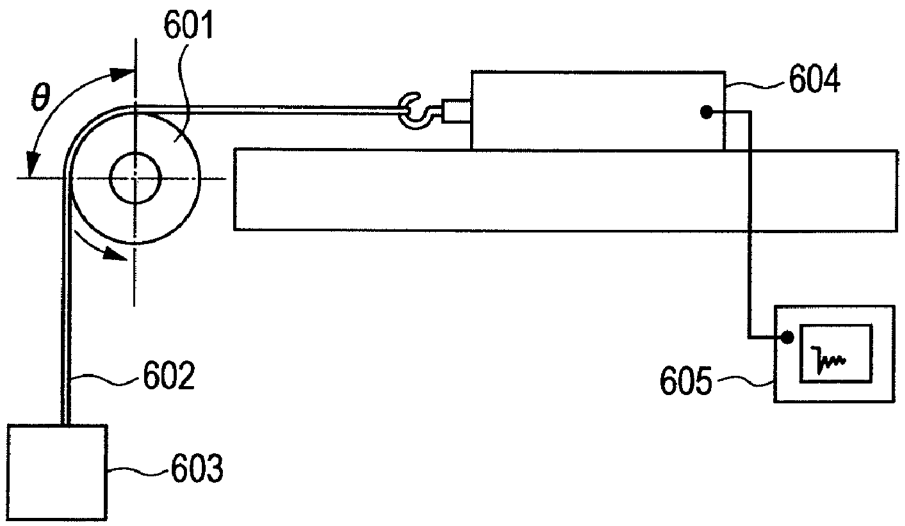
FIG. 7 is a schematic view of a machine for measuring a coefficient of kinetic friction.

The charging roller 1 was subjected to the following measurement of a coefficient of kinetic friction. In the present invention, the coefficient of kinetic friction (μ) of the surface of the charging member means a value measured as described below. The measurement method is in conformity with Euler's belt formula. FIG. 7, illustrates a schematic view of a measuring machine to be used for measuring the coefficient of kinetic friction in the present invention. In FIG. 7, reference numeral 601 represents the charging member as a measuring object and reference numeral 602 represents a belt (having a thickness of 100 μm, a width of 30 mm, and a length of 180 mm, and made of polyethylene terephthalate (PET) (trade name: Lumirror S10 #100, manufactured by Toray Industries, Inc.)) brought into contact with the charging member at a predetermined angle θ. In addition, reference numeral 603 represents a deadweight connected to one end of the belt 602, reference numeral 604 represents a load meter connected to the other end of the belt 602, and reference numeral 605 represents a recorder connected to the load meter 604. When the charging member 601 is rotated in a predetermined direction at a predetermined speed in the state illustrated in FIG. 7, its coefficient of kinetic friction is determined from the following equation (3) when a force measured with the load meter 604 is represented by F (g-wt) and the sum of the weight of the deadweight and the weight of the belt is represented by W (g-wt).

Coefficient of kinetic friction=(1/θ)ln(F/W)

Figure 8:
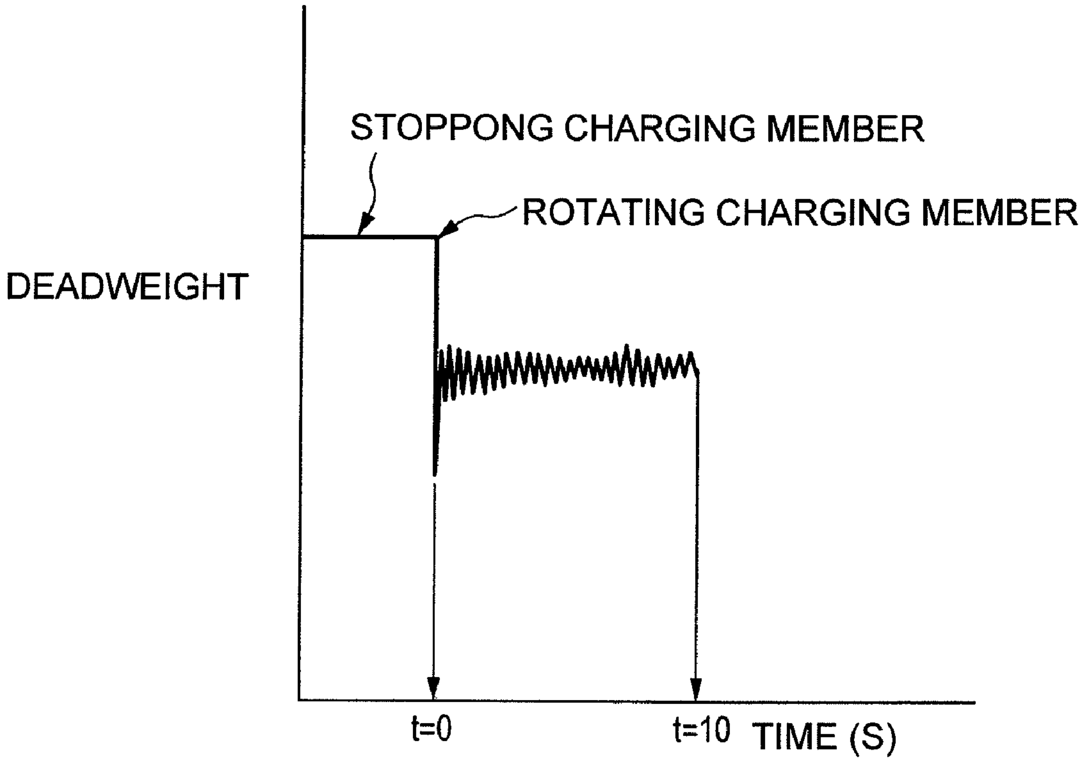
FIG. 8 is a view illustrating an example of the chart of measurement of a coefficient of kinetic friction.

FIG. 8 illustrates an example of a chart obtained by the measurement method.

As a value immediately after the rotation of the charging member is a force needed to initiate the rotation and a value thereafter is a force needed to continue the rotation, a coefficient of friction at a rotation initiation point (that is, at the time point of t=0 (s)) is a coefficient of static friction and a coefficient of friction at an arbitrary time of t>0 (s) is a coefficient of kinetic friction at the arbitrary time. In the present invention, a coefficient of friction obtained after a lapse of 10 seconds from the rotation initiation point was defined as the above-mentioned coefficient of kinetic friction (μ). In the present invention, the W was set to 100 (g-wt), the rotational speed of the charging member was set to 115 rpm, and the measurement was performed under a 23° C., 53% RH environment.

<Evaluation (6): Image Evaluation>

The charging roller 1 was subjected to the following evaluation.

First, the charging roller 1 and an electrophotographic photosensitive member were incorporated into a process cartridge (trade name: "HP 35A (CB435A)," manufactured by Hewlett-Packard Company) capable of integrally supporting the roller and the member. The process cartridge was mounted on a laser beam printer (trade name: "HP LaserJet P1006 Printer," manufactured by Hewlett-Packard Company) capable of outputting A4-sized paper in a longitudinal direction.

It should be noted that the laser beam printer has a print speed of 17 sheets/min and an image resolution of 600 dpi. In addition, the electrophotographic photosensitive member incorporated into the process cartridge together with the charging roller is an organic electrophotographic photosensitive member obtained by forming an organic photosensitive layer having a thickness of 14 μm on a support. In addition, the organic photosensitive layer is a laminated photosensitive layer obtained by laminating a charge-generating layer and a charge-transporting layer containing polycarbonate (binder resin) from the side of the support. Accordingly, the charge-transporting layer serves as the surface layer of the electrophotographic photosensitive member.

Actually used as a developer (toner), which was obtained by blending a binder resin for a developer with a colorant, a charge control agent, a releasing agent, inorganic fine particles, and the like, was a developer charged into the process cartridge (trade name: "HP 35A (CB435A)," manufactured by Hewlett-Packard Company).

A halftone image was output on 750 sheets with the above-mentioned laser printer under an environment having a temperature of 25° C. and a relative humidity of 55%. The halftone image is such an image that horizontal lines each having a width of 2 dots and arranged at an interval of 118 spaces are drawn on A4-sized paper in a direction vertical to the rotation direction of the electrophotographic photosensitive member. In addition, the output of the halftone image was performed according to the so-called intermittent mode in which the rotation of the electrophotographic photosensitive drum was stopped for 7 seconds every time the image was output on one sheet.

After the completion of the output of the halftone image on the 750 sheets, the above-mentioned laser printer was left at rest under the above-mentioned environment for 1 hour, and then the halftone image was output again. The halftone image is referred to as "halftone image 1 for evaluation." Whether or not an image failure resulting from a cleaning failure was occurring at an end of the halftone image 1 for evaluation was visually observed.

Then, when the image failure was observed in the halftone image 1 for evaluation, the halftone image was output on an additional one sheet. The image is referred to as "halftone image 2 for evaluation." The halftone image 2 for evaluation was visually observed so that whether or not an image failure resulting from a cleaning failure was occurring was observed. Then, when the image failure was observed in the halftone image 2 for evaluation as well, a horizontal line image was output on 20 sheets. The 20 electrophotographic images thus obtained in which horizontal lines were drawn were visually observed so that the presence or absence of a streak was observed. The results of the observation of the respective images described above were evaluated by the following criteria.

AA: The occurrence of a streak was not observed in the halftone image 1 for evaluation.

A: The occurrence of a streak was slightly observed at the end of the halftone image 1 for evaluation. However, no streak was observed in the halftone image 2 for evaluation.

B: The occurrence of a streak was slightly observed at the end of the halftone image 1 for evaluation. The occurrence of a streak was slightly observed at the end of the halftone image 2 for evaluation as well. On the other hand, the occurrence of a streak was not observed in any one of the fourth and subsequent images out of the 20 horizontal line images.

C: A streak was somewhat observed at the end of the halftone image 1 for evaluation. A streak was somewhat observed at the end of the halftone image 2 for evaluation as well. On the other hand, no streak was observed in any one of the eleventh and subsequent images out of the 20 horizontal line images.

D: A sharp streak was observed at the end of the halftone image 1 for evaluation. A sharp streak was observed at the end of the halftone image 2 for evaluation as well. In addition, a streak was observed in each of all the 20 horizontal line images.

Examples 2 to 22

<Preparation of Condensates-2 to 22>

Condensates-2 to 22 were each prepared with the condensate intermediate-I prepared in the same manner as in Example 1. Table 5 shows their compositions. It should be noted that the term "ZriPr" in Table 5 represents zirconium isopropoxide. It should be noted that an "AKZ955" (trade name, manufactured by Gelest, Inc., concentration in heptane: 75%) was used as "ZriPr" in an actual reaction.

The condensates-2 to 22 were each subjected to the evaluations (1) and (2) described in Example 1.

TABLE 5

| Condensate | Condensate intermediate | | Hydrolyzable strontium compound | | Hydrolyzable zirconium compound | |
|---|---|---|---|---|---|---|
| No. | No. | (g) | Kind | (mol) | Kind | (mol) |
| 1 | 1 | 35.34 | SrMPr | 0.004 | ZriPr | — |
| 2 | | 27.64 | | 0.010 | | — |
| 3 | | 24.21 | | 0.012 | | — |
| 4 | | 18.56 | | 0.016 | | — |
| 5 | | 25.39 | | 0.004 | | 0.023 |
| 6 | | 18.20 | | 0.010 | | 0.020 |
| 7 | | 15.36 | | 0.012 | | 0.018 |
| 8 | | 10.75 | | 0.016 | | 0.016 |
| 9 | | 21.66 | | 0.004 | | 0.031 |
| 10 | | 14.96 | | 0.010 | | 0.026 |
| 11 | | 12.36 | | 0.012 | | 0.025 |
| 12 | | 17.83 | | 0.004 | | 0.039 |
| 13 | | 11.69 | | 0.010 | | 0.033 |
| 14 | | 9.32 | | 0.012 | | 0.031 |
| 15 | | 5.42 | | 0.016 | | 0.027 |
| 16 | | 13.95 | | 0.004 | | 0.047 |
| 17 | | 8.41 | | 0.010 | | 0.040 |
| 18 | | 6.25 | | 0.012 | | 0.037 |
| 19 | | 11.21 | | 0.004 | | 0.053 |
| 20 | | 6.09 | | 0.010 | | 0.045 |
| 21 | | 4.07 | | 0.012 | | 0.042 |
| 22 | | 0.82 | | 0.016 | | 0.036 |

<Preparation of Coating Solution for Forming Surface Layer>

Coating solutions-2 to 22 for forming surface layers were each obtained in the same manner as in the coating solution-1 for forming a surface layer in Example 1 except that any one of the above-mentioned condensates-2 to 22 was used.

It should be noted that as the synthesized solution for each of the condensates-20 to 22 was slightly opaque when visually observed, each of the condensates was filtrated with a membrane filter having a pore diameter of 0.5 μm and a diluted solution of a photocationic polymerization initiator was added to the condensate.

<Formation of Surface Layer>

Charging rollers 2 to 22 were each produced in the same manner as in Example 1 except that any one of the above-mentioned coating solutions-2 to 22 for forming surface layers was used. Then, each of the rollers was subjected to the evaluations (3) to (6) in the same manner as in Example 1.

Table 6 shows the results of the evaluations (1) to (6) for Examples 1 to 22 described above. In addition, Table 6 shows the molar ratios of the hydrolyzable compounds (the hydrolyzable silane compounds, the hydrolyzable strontium compound, and the hydrolyzable zirconium compound) in the condensates according to the respective examples together with the results.

TABLE 6

| | Hydrolyzable compound | | | | Evaluation | | | | | |
|---|---|---|---|---|---|---|---|---|---|---|
| | (1)-1 | (2)-1 | (3)-1 | (4)-1 | | | | | | |
| Example | GPTMS (mol %) | HeTMS (mol %) | SrMPr (mol %) | ZriPr (mol %) | (1) (wt %) | (2) | (3) (nm) | (4) ($mJ/m^2$) | (5) | (6) |
| 1 | 13.30 | 81.70 | 5.00 | — | 25.25 | A | 100 | 37.2 | 0.38 | B |
| 2 | 11.90 | 73.10 | 15.00 | — | 20.88 | A | 98 | 34.9 | 0.41 | B |
| 3 | 11.20 | 68.80 | 20.00 | — | 19.25 | A | 100 | 33.4 | 0.42 | B |
| 4 | 9.80 | 60.20 | 30.00 | — | 17.35 | A | 100 | 31.2 | 0.48 | C |
| 5 | 9.10 | 55.90 | 5.00 | 30.00 | 25.19 | A | 10 | 38.1 | 0.32 | B |
| 6 | 7.70 | 47.30 | 15.00 | 30.00 | 20.90 | A | 12 | 32.1 | 0.39 | B |
| 7 | 7.00 | 43.00 | 20.00 | 30.00 | 19.87 | A | 10 | 28.1 | 0.42 | B |
| 8 | 5.60 | 34.40 | 30.00 | 30.00 | 12.54 | A | 10 | 37.8 | 0.45 | C |
| 9 | 7.70 | 47.30 | 5.00 | 40.00 | 25.36 | A | 50 | 35.0 | 0.25 | A |
| 10 | 6.30 | 38.70 | 15.00 | 40.00 | 21.32 | A | 55 | 25.0 | 0.35 | A |
| 11 | 5.60 | 34.40 | 20.00 | 40.00 | 19.32 | A | 45 | 32.3 | 0.35 | A |
| 12 | 6.30 | 38.70 | 5.00 | 50.00 | 26.14 | A | 50 | 34.2 | 0.22 | A |
| 13 | 4.90 | 30.10 | 15.00 | 50.00 | 21.45 | A | 20 | 25.1 | 0.24 | AA |
| 14 | 4.20 | 25.80 | 20.00 | 50.00 | 20.36 | A | 25 | 34.1 | 0.29 | A |
| 15 | 2.80 | 17.20 | 30.00 | 50.00 | 17.21 | A | 22 | 40.0 | 0.39 | C |
| 16 | 4.90 | 30.10 | 5.00 | 60.00 | 25.36 | A | 34 | 35.0 | 0.25 | A |
| 17 | 3.50 | 21.50 | 15.00 | 60.00 | 21.87 | A | 31 | 25.0 | 0.16 | AA |
| 18 | 2.80 | 17.20 | 20.00 | 60.00 | 20.86 | A | 30 | 27.9 | 0.33 | A |
| 19 | 3.92 | 24.08 | 5.00 | 67.00 | 25.31 | A | 30 | 34.8 | 0.15 | A |
| 20 | 2.52 | 15.48 | 15.00 | 67.00 | 20.59 | B | 29 | 25.1 | 0.20 | A |
| 21 | 1.82 | 11.18 | 20.00 | 67.00 | 20.37 | B | 30 | 35.0 | 0.35 | A |
| 22 | 0.42 | 2.58 | 30.00 | 67.00 | 16.39 | B | 30 | 41.0 | 0.38 | B |

Examples 23 to 29

<Preparation of Condensate Intermediates-II to VI>

Condensate intermediates-II to VI were each prepared in the same manner as in the condensate intermediate-I in Example 1 except that the kinds and amounts of the hydrolyzable compounds were changed as shown in Table 7 below.

TABLE 7

| | Hydrolyzable compound | | | | |
|---|---|---|---|---|---|
| Condensate intermediate No. | (1)-1 GPTMS (mol) | (1)-2 ECTMS (mol) | (2)-1 HeTMS (mol) | (2)-2 DeTMS (mol) | (2)-3 PhTMS (mol) |
| II | — | 0.052 | 0.317 | — | — |
| III | 0.052 | — | — | 0.317 | — |
| IV | 0.052 | — | — | — | 0.317 |
| V | 0.053 | — | 0.114 | — | 0.213 |
| VI | 0.140 | — | 0.210 | — | — |

It should be noted that, in Table 7, abbreviations for the hydrolyzable compounds mean the following compounds, respectively.

ECTMS: epoxycyclohexylethyltrimethoxysilane [trade name: KBM-303, manufactured by Shin-Etsu Chemical Co., Ltd.]

DeTMS: decyltrimethoxysilane [trade name: KBM-3103, manufactured by Shin-Etsu Chemical Co., Ltd.]

PhTMS: phenyltrimethoxysilane [trade name: KBM-103, manufactured by Shin-Etsu Chemical Co., Ltd.]

<Preparation of Condensates-23 to 29>

Condensates-23 to 29 were each prepared in the same manner as in the condensate-1 of Example 1 except that: any one of the condensate intermediate-I prepared in the same manner as in Example 1, and the condensate intermediates-II to VI prepared in the foregoing was used; and any composition shown in Table 8 below was adopted. Those condensates were each subjected to the evaluations (1) and (2).

TABLE 8

| Condensate | Condensate intermediate | | Hydrolyzable strontium compound | | | | Hydrolyzable zirconium compound | | | |
|---|---|---|---|---|---|---|---|---|---|---|
| No. | No. | (g) | Kind | (mol) | Kind | (mol) | Kind | (mol) | Kind | (mol) |
| 23 | II | 11.69 | SrMPr | 0.010 | — | — | ZriPr | 0.033 | — | — |
| 24 | III | 11.69 | " | 0.010 | — | — | " | 0.033 | — | — |
| 25 | IV | 11.69 | " | 0.010 | — | — | " | 0.033 | — | — |
| 26 | I | 11.69 | — | — | SriPr | 0.010 | " | 0.033 | — | — |
| 27 | I | 11.69 | SrMPr | 0.010 | — | — | — | — | ZrnPr | 0.033 |
| 28 | V | 11.69 | " | 0.010 | — | — | ZriPr | 0.033 | — | — |
| 29 | VI | 11.69 | " | 0.010 | — | — | " | 0.033 | — | — |

<Preparation of Coating Solution for Forming Surface Layer>

<<Preparation of Coating Solution-23>>

A coating solution-23 was obtained by adding the methanol-diluted solution of the photocationic polymerization initiator prepared in the same manner as in Example 1 so that the amount of the photocationic polymerization initiator was 1.0 part by mass with respect to 100 parts by mass of the solid content of 50 g of the condensate-23.

<<Preparation of Coating Solution-24>>

A coating solution-24 was obtained by adding the methanol-diluted solution of the photocationic polymerization initiator prepared in the same manner as in Example 1 so that the amount of the photocationic polymerization initiator was 5.0 parts by mass with respect to 100 parts by mass of the solid content of 50 g of the condensate-24.

<<Preparation of Coating Solution-25>>

A coating solution-25 was obtained in the same manner as in the coating solution-23 except that the condensate-25 was used.

<<Preparation of Coating Solutions-26 to 29>>

Coating solutions-26 to 29 were each obtained in the same manner as in the coating solution-1 of Example 1 except that any one of the condensates-26 to 29 was used.

<Production of Charging Rollers 22 to 29>

Charging rollers were each produced in the same manner as in Example 1 except that any one of the above-mentioned coating solutions-22 to 29 was used. Then, the charging rollers were each subjected to the evaluations (3) to (6).

Table 9 shows the molar ratios of the hydrolyzable compounds (the hydrolyzable silane compounds, the hydrolyzable strontium compounds, and the hydrolyzable zirconium compounds) in the condensates-23 to 29 according to Examples 23 to 29 described above. It should be noted that, in Table 9, the term "SriPr" represents strontium isopropoxide and the term "ZrnPr" represents zirconium tetra-n-propoxide. In addition, Table 10 shows the results of the evaluations (1) to (6) for the respective examples.

TABLE 9

| | Hydrolyzable compound | | | | | | | | |
|---|---|---|---|---|---|---|---|---|---|
| Example | (1)-1 GPTMS (mol %) | (1)-2 ECTMS (mol %) | (2)-1 HeTMS (mol %) | (2)-2 DeTMS (mol %) | (2)-3 PhTMS (mol %) | (3)-1 SrMPr (mol %) | (3)-2 SriPr (mol %) | (4)-1 ZriPr (mol %) | (4)-2 ZrnPr (mol %) |
| 23 | — | 4.90 | 30.10 | — | — | 15.00 | — | 50.00 | — |
| 24 | 4.90 | — | — | 30.10 | — | 15.00 | — | 50.00 | — |
| 25 | 4.90 | — | — | — | 30.10 | 15.00 | — | 50.00 | — |
| 26 | 4.90 | — | 30.10 | — | — | — | 15.00 | 50.00 | — |
| 27 | 4.90 | — | 30.10 | — | — | 15.00 | — | — | 50.00 |
| 28 | 4.90 | — | 10.50 | — | 19.60 | 15.00 | — | 50.00 | — |
| 29 | 14.00 | — | 21.00 | — | — | 15.00 | — | 50.00 | — |

TABLE 10

| | Evaluation | | | | | |
|---|---|---|---|---|---|---|
| Example | (1) (wt %) | (2) | (3) (nm) | (4) ($mJ/m^2$) | (5) | (6) |
| 23 | 25.21 | A | 80 | 26.4 | 0.22 | AA |
| 24 | 26.36 | A | 85 | 32.3 | 0.26 | AA |
| 25 | 25.94 | A | 70 | 27.4 | 0.27 | AA |
| 26 | 26.17 | A | 85 | 31.0 | 0.24 | AA |
| 27 | 25.55 | A | 60 | 25.2 | 0.28 | AA |
| 28 | 25.76 | A | 55 | 32.0 | 0.16 | AA |
| 29 | 26.31 | A | 60 | 28.2 | 0.18 | AA |

Comparative Examples 1 to 5

<Preparation of Condensates-30 to 34>

Condensates-31 to 34 were each prepared in the same manner as in the condensate-1 by using the condensate intermediate-I produced in the same manner as in Example 1 and a hydrolyzable zirconium compound as shown in Table 11 below. In addition, the condensate intermediate-I was directly used as a condensate-30. The condensates-30 to 33 were each subjected to the evaluations (1) and (2). On the other hand, the condensate-34 was not subjected to the evaluation (1) because opacification and precipitation occurred.

TABLE 11

| Condensate | Condensate intermediate | | Hydrolyzable zirconium compound | |
|---|---|---|---|---|
| No. | No. | (g) | Kind | (mol) |
| 30 | I | 35.34 | — | — |
| 31 | I | 30.05 | ZriPr | 0.026 |
| 32 | I | 21.79 | " | 0.043 |
| 33 | I | 14.59 | " | 0.059 |
| 34 | I | 13.27 | " | 0.061 |

<Preparation of Coating Solutions-30 to 33>

Coating solutions-30 to 33 were each prepared in the same manner as in the coating solution-1 except that any one of the condensates-30 to 33 was used.

<Production of Charging Rollers 30 to 33>

Charging rollers 30 to 33 were each produced in the same manner as in the charging roller 1 except that any one of the coating solutions-30 to 33 was used. Then, the charging rollers were each subjected to the evaluations (3) to (6).

Table 12 shows the molar ratios of the hydrolyzable compounds (the hydrolyzable silane compound, the hydrolyzable strontium compound, and the hydrolyzable zirconium compound) used in the preparation of the condensates-30 to 34 according to Comparative Examples 1 to 5 described above, and the results of the evaluations (1) to (6) for the respective comparative examples. It should be noted that, in Comparative Example 5, the production of a charging roller involving using the condensate-34 was not performed.

TABLE 12

| | Hydrolyzable compound | | | | | | | | |
|---|---|---|---|---|---|---|---|---|---|
| | (1)-1 | (2)-1 | (4)-1 | Evaluation | | | | | |
| Comparative Example | GPTMS (mol %) | HeTMS (mol %) | ZriPr (mol %) | (1) (wt %) | (2) | (3) (nm) | (4) ($mJ/m^2$) | (5) | (6) |
| 1 | 14.00 | 86.00 | — | | A | 35 | 40.2 | 0.53 | D |
| 2 | 9.80 | 60.20 | 30.00 | | A | 42 | 42.9 | 0.32 | D |
| 3 | 7.00 | 43.00 | 50.00 | | A | 38 | 43.1 | 0.22 | D |
| 4 | 4.62 | 28.38 | 67.00 | | B | 40 | 45.2 | 0.15 | D |
| 5 | 4.20 | 25.80 | 70.00 | — | C | — | — | — | — |

As described above, according to the charging member for electrophotography of the present invention, the adhesion or fixation of toner, an external additive, and the like that have escaped from a cleaning blade end to the surface of the charging member can be suppressed particularly upon activation of a photosensitive member from its stop state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority of Japanese Patent Application No. 2010-215810, filed on Sep. 27, 2010, and the content thereof is incorporated herein by reference.

What is claimed is:

1. A charging member, comprising:

a support;

an elastic layer; and a surface layer, wherein the surface layer comprises a polymer having an Si—O—Sr bond and having a structural unit represented by the following formula (1) and a structural unit represented by the following formula (2):

formula (1)

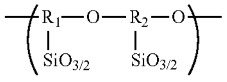

formula (2)

$SrO_{2/2}$ in the formula (1), $R_1$ and $R_2$ each independently represent any one of the following formulae (3) to (6):

formula (3)

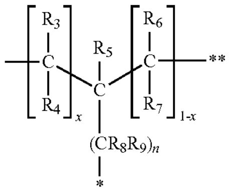

-continued formula (4)

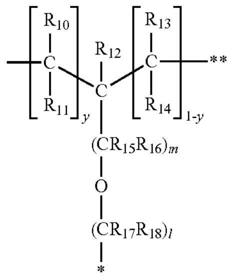

formula (5)

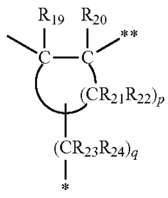

formula (6)

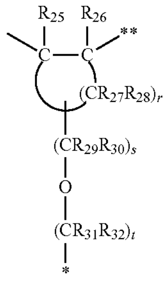

in the formulae (3) to (6):

$R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group;

$R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms;

$R_{21}$, $R_{22}$, $R_{27}$, and $R_{28}$ each independently represent hydrogen, an alkoxy group having 1 to 4 carbon atoms, or an alkyl group having 1 to 4 carbon atoms;

n, m, l, q, s, and t each independently represent an integer of from 1 to 8;

p and r each independently represent an integer of from 4 to 12;

x and y each independently represent 0 or 1; and a symbol "*" and a symbol "**" represent bonding positions to a silicon atom and an oxygen atom in the formula (1), respectively.

2. The charging member according to claim 1, wherein when a total amount of molar contents of silicon atoms and strontium atoms in the surface layer is set to 100 mol %, the content of the strontium atoms is from 5 mol % to 20 mol %.

3. The charging member according to claim 1, wherein $R_1$ and $R_2$ in the formula (1) each independently represent a structure selected from the group consisting of structures represented by the following formulae (8) to (11):

formula (8)

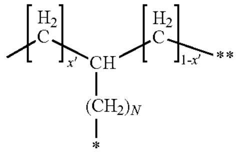

formula (9)

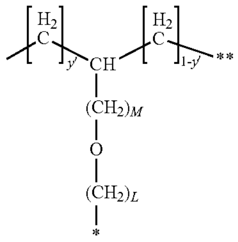

formula (10)

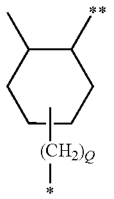

formula (11)

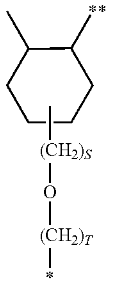

in the formulae (8) to (11),

N, M, L, Q, S, and T each independently represent an integer of from 1 to 8;

x' and y' each independently represent 0 or 1; and a symbol "*" and a symbol "**" represent bonding positions to a silicon atom and an oxygen atom in the formula (1), respectively.

4. The charging member according to claim 1, wherein the polymer further has a structural unit represented by the following formula (7) and has an Si—O—Zr bond.

$$ZrO_{4/2} \qquad \text{formula (7)}$$

5. The charging member according to claim 4, wherein when a total amount of molar contents of silicon atoms, strontium atoms, and zirconium atoms in the surface layer is set to 100 mol %, the content of the strontium atoms is from 5 mol % to 20 mol %, and the content of the zirconium atoms is from 40 mol % to 67 mol %.

6. A process cartridge, comprising:

the charging member according to claim 1; and a photosensitive member, wherein the process cartridge is detachably mountable to a main body of an electrophotographic apparatus.

7. An electrophotographic apparatus, comprising the charging member according to claim 1.

* * * * *